United States Patent
Mack

(10) Patent No.: US 9,227,548 B1
(45) Date of Patent: Jan. 5, 2016

(54) CATTLE CHUTE TRANSPORTING SYSTEM

(71) Applicant: Kevin N. Mack, Castlewood, SD (US)

(72) Inventor: Kevin N. Mack, Castlewood, SD (US)

(*) Notice: Subject to any disclaimer, the term of this patent is extended or adjusted under 35 U.S.C. 154(b) by 57 days.

(21) Appl. No.: 14/088,752

(22) Filed: Nov. 25, 2013

(51) Int. Cl.
| | | |
|---|---|---|
| *B65G 15/00* | (2006.01) | |
| *B60P 3/42* | (2006.01) | |
| *A01B 59/06* | (2006.01) | |
| *B62D 49/02* | (2006.01) | |
| *B65G 69/30* | (2006.01) | |

(52) U.S. Cl.
CPC .................. *B60P 3/42* (2013.01); *A01B 59/066* (2013.01); *B62D 49/02* (2013.01); *B65G 69/30* (2013.01)

(58) Field of Classification Search
CPC ...... A01B 59/066; B62D 49/02; B65G 69/30; B60P 3/42
USPC .......... 119/843, 847; 172/439, 440, 441, 442, 172/443, 444, 445, 445.1, 445.2, 446, 447, 172/448, 449, 450, 451
See application file for complete search history.

(56) References Cited

U.S. PATENT DOCUMENTS

| | | | | |
|---|---|---|---|---|
| 2,710,569 | A * | 6/1955 | Altgelt | 172/272 |
| 3,447,816 | A * | 6/1969 | Shannon | 280/452 |
| 3,583,494 | A * | 6/1971 | Thompson et al. | 172/285 |
| 4,526,393 | A * | 7/1985 | Smith | 280/406.1 |
| 6,964,245 | B2 * | 11/2005 | Beck | 119/512 |
| 7,487,843 | B2 * | 2/2009 | Tuttle et al. | 172/272 |
| 2011/0146591 | A1 * | 6/2011 | Pingsterhaus | 119/732 |
| 2012/0261899 | A1 * | 10/2012 | Ockunzzi | 280/416.1 |

* cited by examiner

*Primary Examiner* — Rob Swiatek
*Assistant Examiner* — Ebony Evans

(57) ABSTRACT

A system for transporting a cattle chute with a tractor features a tractor having a hydraulically activated three-point hitch featuring a first three-point hitch leg, a second three-point hitch leg, and a center three-point hitch leg. The system features a cattle chute having a first side pickup, a second side pickup, and a center pickup. The system features a "U" shaped chute hitch having a first chute hitch leg, a second chute hitch leg, and a horizontal chute hitch connector. The chute hitch is located on the three-point hitch and features a first hook, a second hook, and a center hook. The first hook engages the first side pickup. The second hook engages the second side pickup. The center hook engages the center pickup. The hydraulically activated three-point hitch lifts the cattle chute for transport via the chute hitch.

3 Claims, 6 Drawing Sheets

US 9,227,548 B1

CATTLE CHUTE TRANSPORTING SYSTEM

FIELD OF THE INVENTION

The present invention relates to cattle chute transport systems.

BACKGROUND OF THE INVENTION

Cattle chutes are used all across the country and all over the world to load cattle from a pen into a trailer. Even though they work very well, they must be built of sturdy construction to withstand the weight of full grown cattle passing thereon. The sturdy construction makes the cattle chute heavy and difficult to move, thus requiring an awkward, and unsafe attachment to a forklift, a front end loader, or a tractor using chains. The present invention features a system for transporting a cattle chute with a tractor.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

SUMMARY OF THE INVENTION

The present invention features a system for transporting a cattle chute with a tractor. In some embodiments, the system comprises a tractor having a hydraulically activated three-point hitch. In some embodiments, the three-point hitch comprises a first three-point hitch leg, a second three-point hitch leg, and a center three-point hitch leg.

In some embodiments, the system comprises a cattle chute comprising a first side pickup horizontally located on a cattle chute front structure close to a cattle chute first side. In some embodiments, the cattle chute comprises a second side pickup horizontally located on the cattle chute front structure close to a cattle chute second side. In some embodiments, the cattle chute comprises a center pickup horizontally centrally located on the cattle chute front structure vertically offset from the first side pickup and the second side pickup.

In some embodiments, the system comprises a "U" shaped chute hitch having a first chute hitch leg, a second chute hitch leg, and a horizontal chute hitch connector. In some embodiments, the chute hitch is located on the three-point hitch. In some embodiments, the chute hitch comprises a first hook, a second hook, and a center hook.

In some embodiments, the tractor is backed up toward the cattle chute front structure. In some embodiments, the chute hitch is raised via the hydraulically activated three-point hitch. In some embodiments, the first hook engages the first side pickup. In some embodiments, the second hook engages the second side pickup. In some embodiments, the center hook engages the center pickup. In some embodiments, the hydraulically activated three-point hitch lifts the cattle chute for transport via the chute hitch.

DESCRIPTION OF PREFERRED EMBODIMENTS

Figure 1:
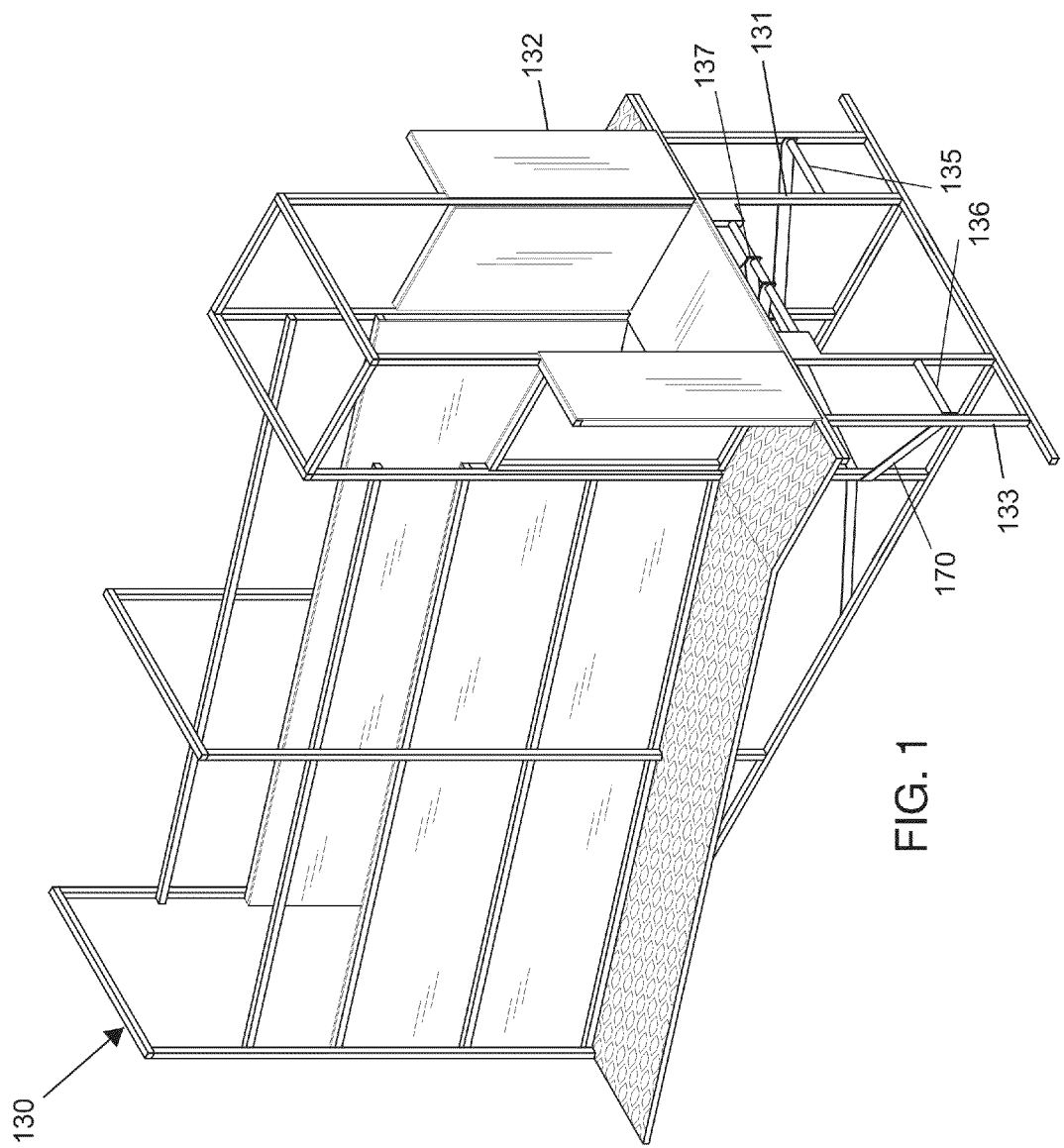
FIG. 1 shows a perspective view of the cattle chute of the present invention.
Figure 2:
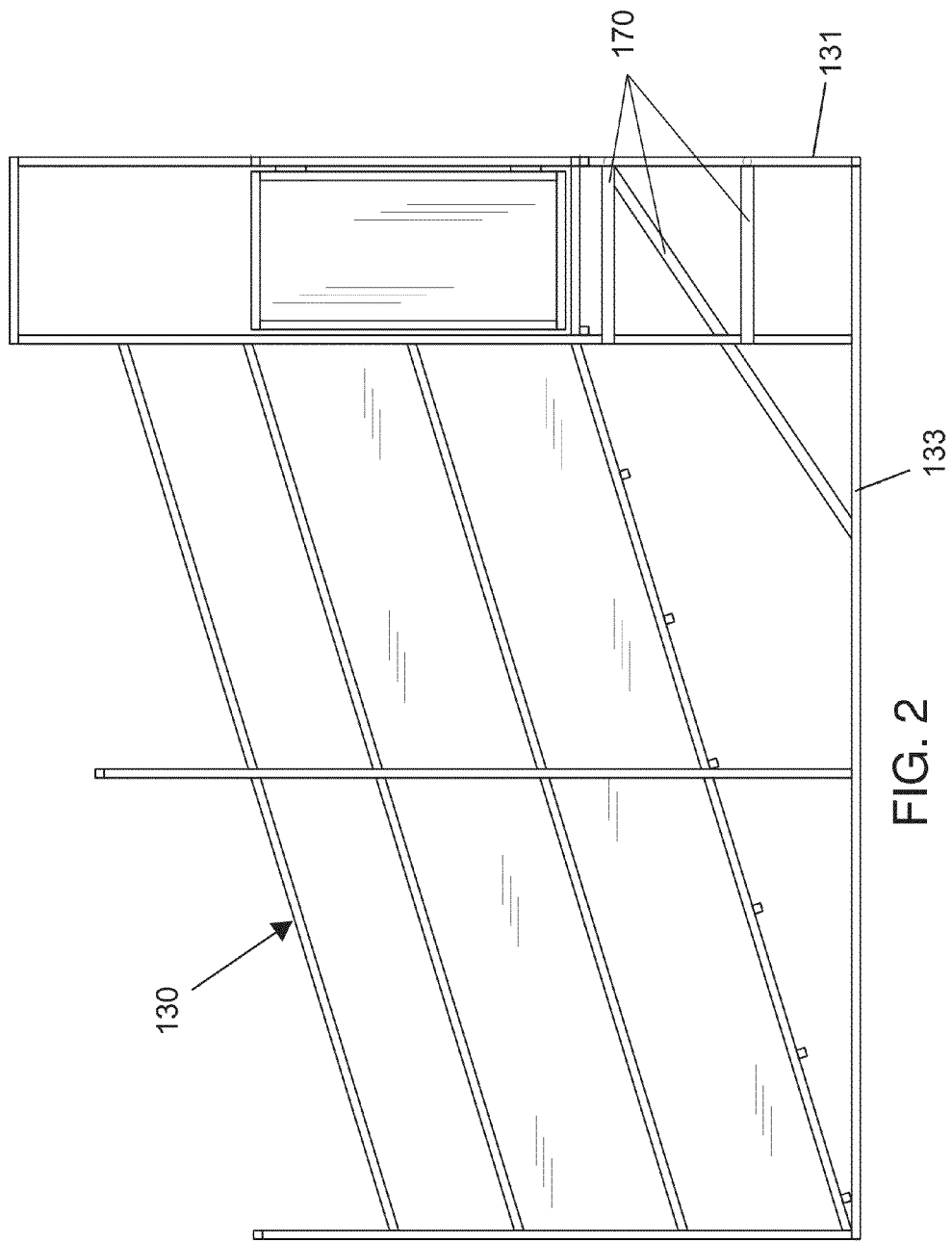
FIG. 2 shows a side view of the cattle chute of the present invention.
Figure 3:
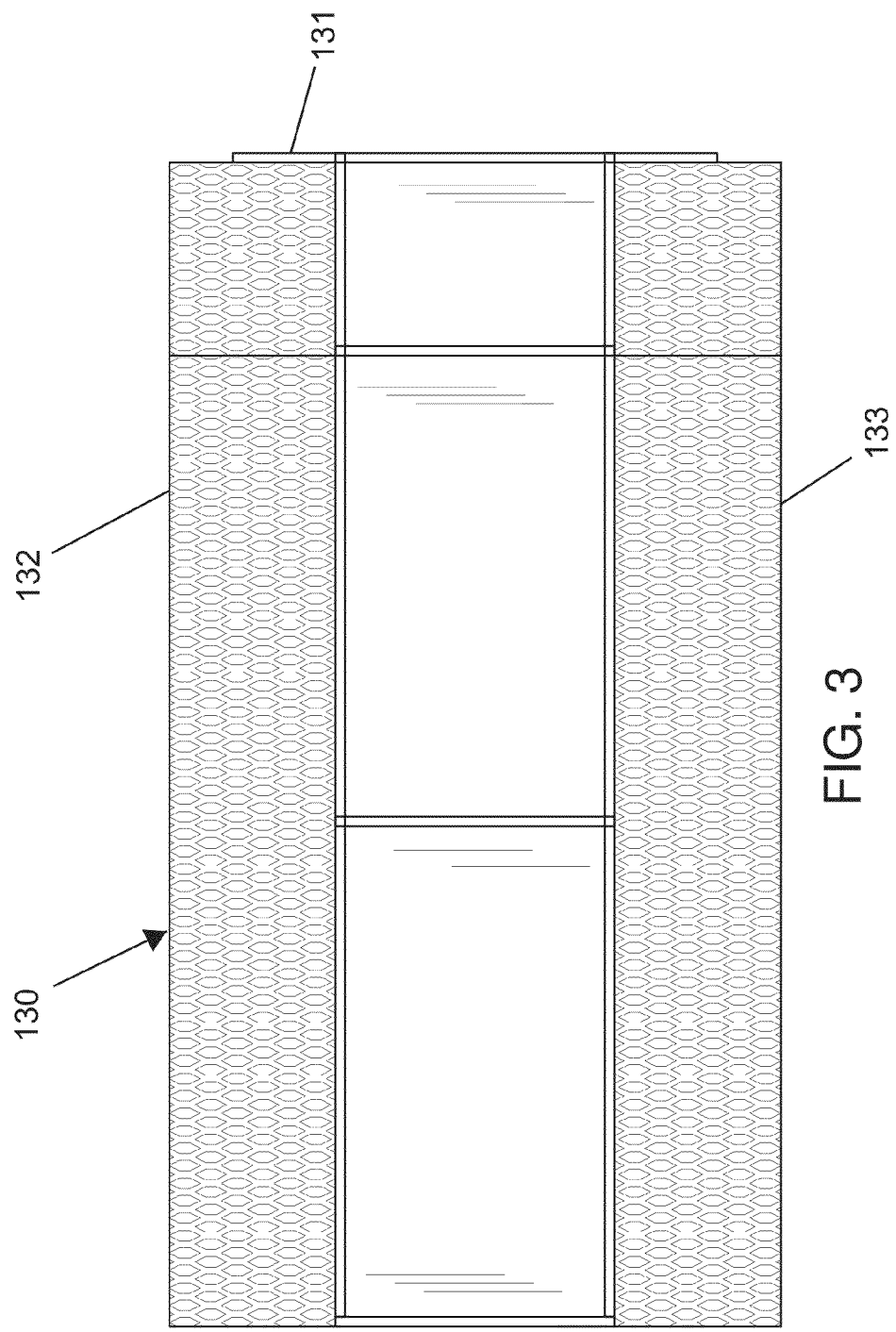
FIG. 3 shows a top view of the cattle chute of the present invention.
Figure 5:
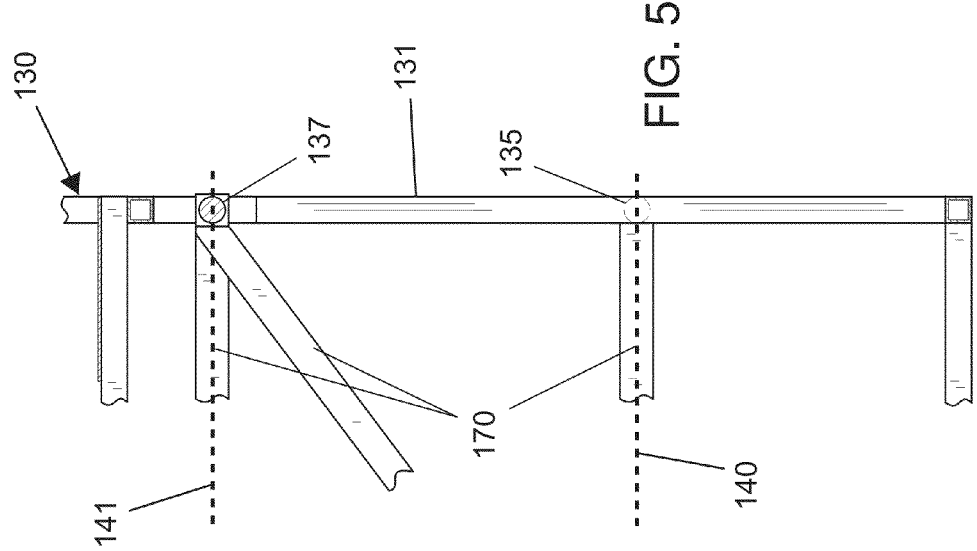
FIG. 5 shows a cross-sectional view of the cattle chute front structure of the present invention.
Figure 4:
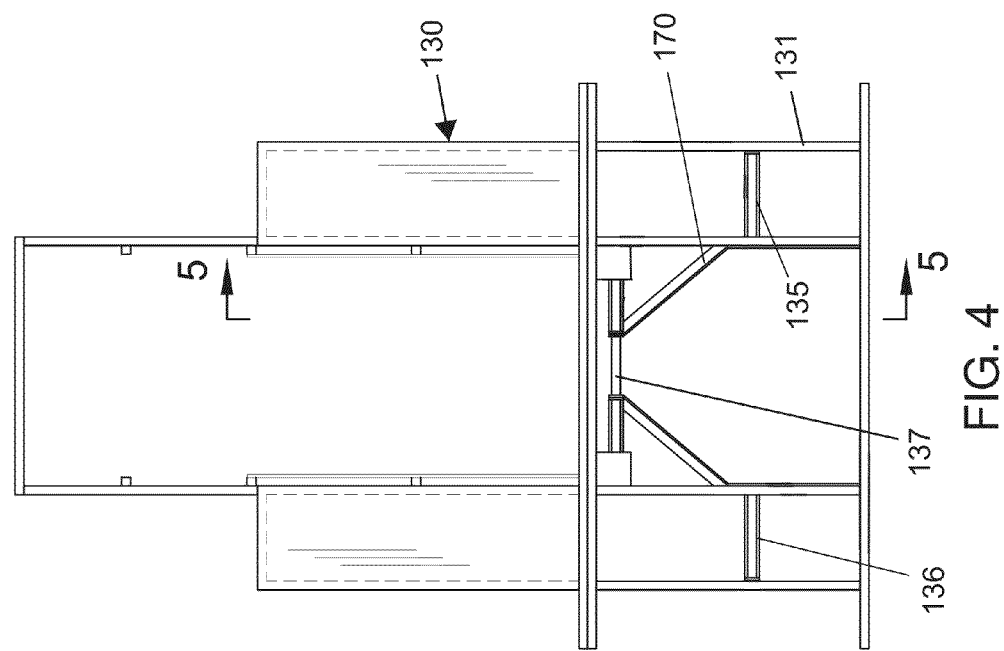
FIG. 4 shows a front view of the cattle chute of the present invention.
Figure 6:
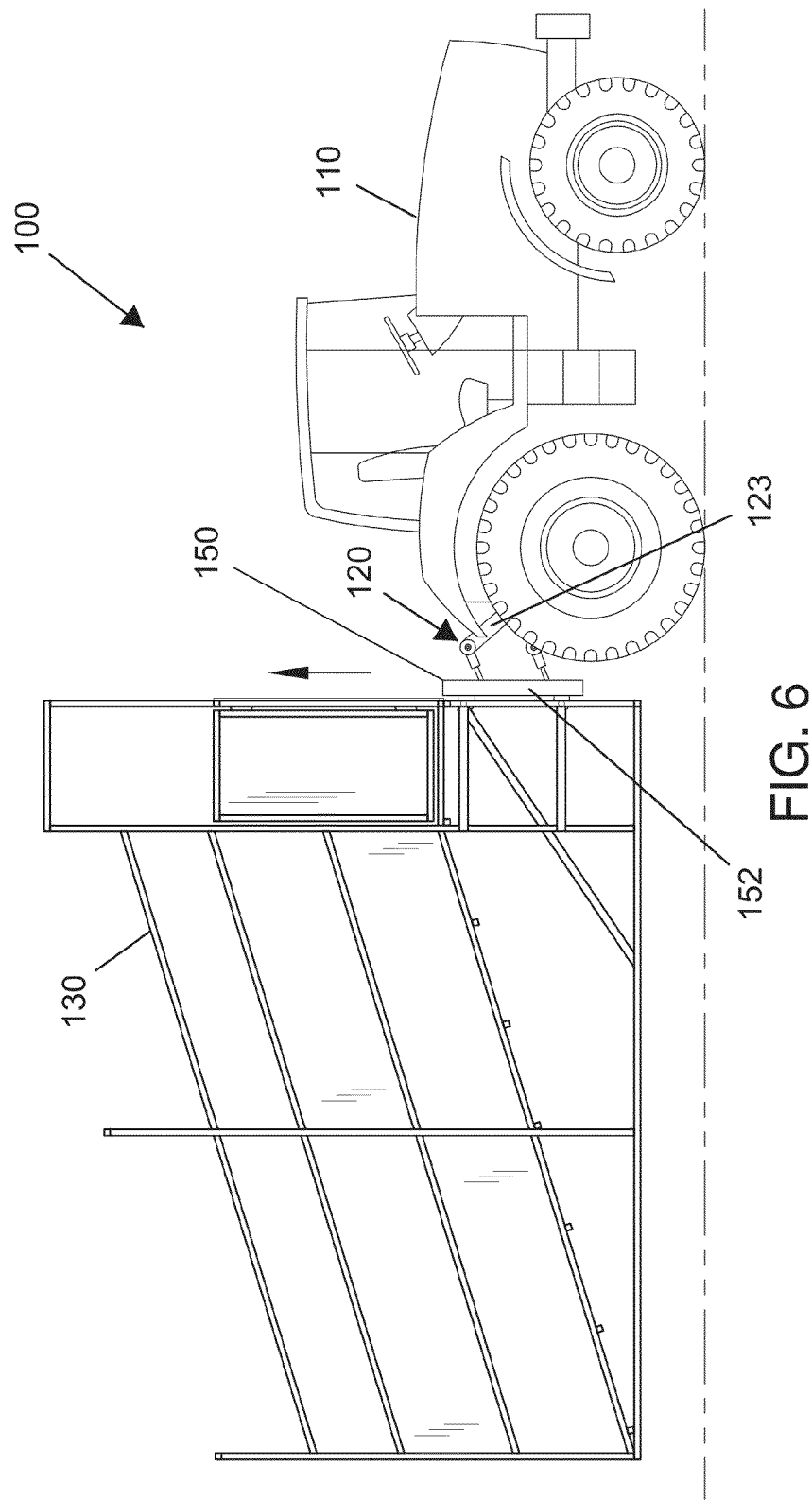
FIG. 6 shows a side view of the present invention.
Figure 7:
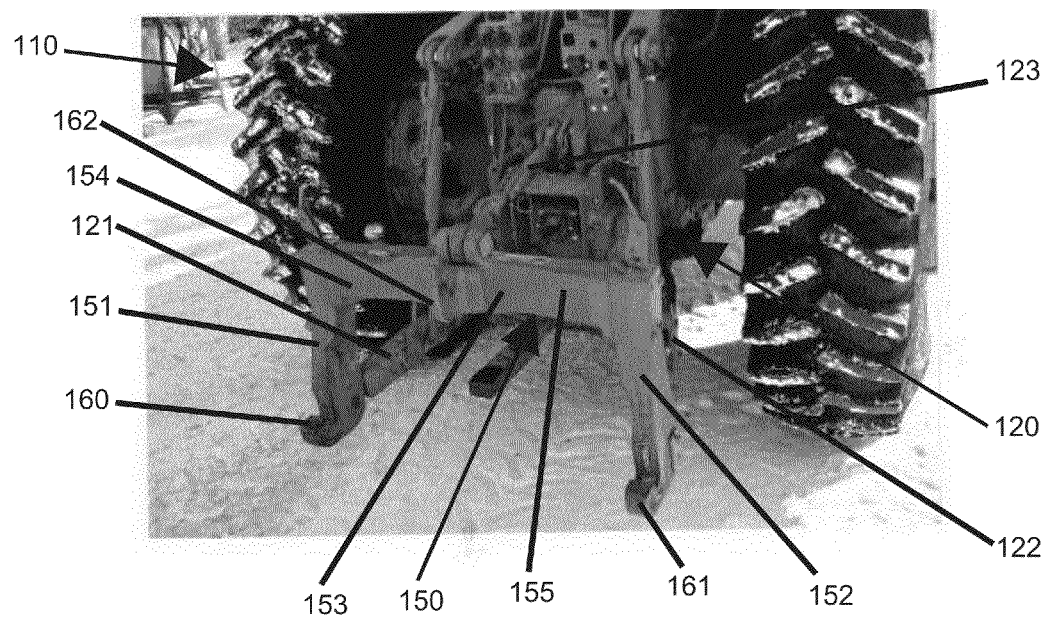
FIG. 7 shows a perspective view of the three-point hitch and the chute hitch of the present invention.

Following is a list of elements corresponding to a particular element referred to herein:
100 Cattle chute transporting system
110 Tractor
120 Three-point hitch
121 First three-point hitch leg
122 Second three point hitch leg
123 Center three point hitch leg
130 Cattle chute
131 Cattle chute front structure
132 Cattle chute first side
133 Cattle chute second side
135 First side pickup
136 Second side pickup
137 Center pickup
140 Side pickup plane
141 Center pickup plane
150 Chute hitch
151 First chute hitch leg
152 Second chute hitch leg
153 Chute hitch connector
154 Chute hitch connector first side
155 Chute hitch connector second side
160 First hook
161 Second hook
162 Center hook
170 Linear support member Referring now to FIG. 1-7, the present invention features a cattle chute transporting system (100) for transporting a cattle chute with a tractor. In some embodiments, the system (100) comprises a tractor (110) having a hydraulically activated three-point hitch (120). In some embodiments, the three-point hitch (120) comprises a first three-point hitch leg (121), a second three-point hitch leg (122), and a center three-point hitch leg (123). In some embodiments, the first three-point hitch leg (121) and the second three-point hitch leg (122) are parallel. In some embodiments, the center three-point hitch leg (123) is located between the first three-point hitch leg (121) and the second three-point hitch leg (122). Three-point hitches are well known to those of ordinary skill in the art.

In some embodiments, the system (100) comprises a cattle chute (130) comprising a linear first side pickup (135) horizontally located on a cattle chute front structure (131) close to a cattle chute first side (132). In some embodiments, the first side pickup (135) lies on a horizontal side pickup plane (140).

In some embodiments, the system (100) comprises a cattle chute (130) comprising a linear second side pickup (136) horizontally located on a cattle chute front structure (131) close to a cattle chute second side (133). In some embodiments, the second side pickup (136) lies on the horizontal side pickup plane (140).

In some embodiments, the system (100) comprises a cattle chute (130) comprising a linear center pickup (137) horizontally centrally located on a cattle chute front structure (131)

vertically offset from the first side pickup (135) and the second side pickup (136) on a horizontal center pickup plane (141). In some embodiments, the side pickup plane (140) is parallel to the center pickup plane (141). In some embodiments, the center pickup plane (141) is above the side pickup plane (140) when the cattle chute (130) is in a position for use.

In some embodiments, the first side pickup (135), the second side pickup (136), and the center pickup (137) are permanently mounted to the cattle chute (130). In some embodiments, the first side pickup (135), the second side pickup (136), and the center pickup (137) are removably mounted to the cattle chute (130). In some embodiments, the first side pickup (135), the second side pickup (136), and the center pickup (137) comprises a kit that can be installed on an existing cattle chute (130). In some embodiments, cattle chutes (130) are well known to those of ordinary skill in the art.

In some embodiments, the system (100) comprises a "U" shaped chute hitch (150) having a first chute hitch leg (151), a second chute hitch leg (152), and a horizontal chute hitch connector (153). In some embodiments, the first chute hitch leg (151) is located on and extends downwardly from a horizontal chute hitch connector first side (154). In some embodiments, the second chute hitch leg (152) is located on and extends downwardly from a horizontal chute hitch connector second side (155).

In some embodiments, the chute hitch (150) is removably located on the three-point hitch (120). In some embodiments, the first three-point-hitch leg (121) is pivotally located on the first chute hitch leg (151). In some embodiments, the second three-point hitch leg (122) is pivotally located on the second chute hitch leg (152). In some embodiments, the center three-point hitch leg (123) is pivotally located at a midpoint on the horizontal chute hitch connector (153).

In some embodiments, the chute hitch (150) comprises a first hook (160), a second hook (161), and a center hook (162). In some embodiments, the first hook (160), the second hook (161), and the center hook (162) face upward. In some embodiments, the first hook (160) is located on a lowermost point on the first chute hitch leg (151). In some embodiments, the second hook (161) is located on a lowermost point on the second chute hitch leg (152). In some embodiments, the center hook (162) is centrally located on the horizontal chute hitch connector (153). In some embodiments, the first hook (160), the second hook (161), and the center hook (162) project out and away from the chute hitch (150) opposite the three-point hitch (120).

In some embodiments, the tractor (110) is moved toward the cattle chute front structure (131). In some embodiments, the chute hitch (150) interfaces with the cattle chute front structure (131). In some embodiments, the chute hitch (150) is raised via the hydraulically activated three-point hitch (120). In some embodiments, the first hook (160) engages the first side pickup (135). In some embodiments, the second hook (161) engages the second side pickup (136). In some embodiments, the center hook (162) engages the center pickup (137). In some embodiments, the hydraulically activated three-point hitch (120) lifts the cattle chute (130) for transport via the chute hitch (150).

In some embodiments, a method for transporting a cattle chute (130) comprises moving the tractor (110) toward the cattle chute front structure (131). In some embodiments, the chute hitch (150) interfaces with the cattle chute front structure (131). In some embodiments, the method comprises raising the chute hitch (150) is via the hydraulically activated three-point hitch (120). In some embodiments, the first hook (160) engages the first side pickup (135). In some embodiments, the second hook (161) engages the second side pickup (136). In some embodiments, the center hook (162) engages the center pickup (137). In some embodiments, the hydraulically activated three-point hitch (120) lifts the cattle chute (130) for transport via the chute hitch (150).

In some embodiments, the first side pickup (135), the second side pickup (136), and the center pickup (137) are each permanently attached to the cattle chute (130) on two opposing ends.

In some embodiments, the first side pickup (135), the second side pickup (136), and the center pickup (137) are each permanently attached to the cattle chute (130) for a third point of support via a separate angled linear support member (170) located thereon.

In some embodiments, the first side pickup (135), the second side pickup (136), and the center pickup (137) are constructed from round steel comprising a diameter between 1 inch and 2 inches.

As used herein, the term "about" refers to plus or minus 10% of the referenced number.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims. Reference numbers recited in the claims are exemplary and for ease of review by the patent office only, and are not limiting in any way. In some embodiments, the figures presented in this patent application are drawn to scale, including the angles, ratios of dimensions, etc. In some embodiments, the figures are representative only and the claims are not limited by the dimensions of the figures. In some embodiments, descriptions of the inventions described herein using the phrase "comprising" includes embodiments that could be described as "consisting of", and as such the written description requirement for claiming one or more embodiments of the present invention using the phrase "consisting of" is met.

The reference numbers recited in the below claims are solely for ease of examination of this patent application, and are exemplary, and are not intended in any way to limit the scope of the claims to the particular features having the corresponding reference numbers in the drawings.

What is claimed is:

1. A cattle chute transporting system (100) for transporting a cattle chute with a tractor, wherein the system (100) comprises:
 (a) a tractor (110) having a hydraulically activated three-point hitch (120), wherein the three-point hitch (120) comprises a first three-point hitch leg (121), a second three-point hitch leg (122), and a center three-point hitch leg (123), wherein the first three-point hitch leg (121) and the second three-point hitch leg (122) are parallel, wherein the center three-point hitch leg (123) is disposed between the first three-point hitch leg (121) and the second three-point hitch leg (122);
 (b) a cattle chute (130) comprising:
  (i) a linear first side pickup (135) horizontally disposed on a cattle chute front structure (131) proximal to a cattle chute first side (132), wherein the first side pickup (135) lies on a side pickup plane (140), (ii) a linear second side pickup (136) horizontally disposed on the cattle chute front structure (131) proximal to a cattle chute second side (133), wherein the second side pickup (136) lies on the side pickup plane (140), and (iii) a linear center pickup (137) horizontally centrally disposed on the cattle chute front structure (131) vertically offset from the first side pickup (135) and the second side pickup (136) on a center pickup plane (141), wherein the center pickup plane (141) is above the side pickup plane (140) when the cattle chute (130) is in a position for use; and (c) a "U" shaped chute hitch (150) having a first chute hitch leg (151), a second chute hitch leg (152), and a horizontal chute hitch connector (153), wherein the first chute hitch leg (151) is disposed on and extends downwardly from a horizontal chute hitch connector first side (154), wherein the second chute hitch leg (152) is disposed on and extends downwardly from a horizontal chute hitch connector second side (155), wherein the chute hitch (150) is disposed on the three-point hitch (120), wherein the first three-point hitch leg (121) is pivotally disposed on the first chute hitch leg (151), wherein the second three-point hitch leg (122) is pivotally disposed on the second chute hitch leg (152), wherein the center three-point hitch leg (123) is pivotally disposed at a midpoint on the horizontal chute hitch connector (153), wherein the chute hitch (150) comprises a first hook (160), a second hook (161), and a center hook (162), wherein the first hook (160) is disposed on a lowermost point on the first chute hitch leg (151), wherein the second hook (161) is disposed on a lowermost point on the second chute hitch leg (152), wherein the center hook (162) is centrally disposed on the horizontal chute hitch connector (153), wherein the first hook (160), the second hook (161), and the center hook (162) project out and away from the chute hitch (150) opposite the three-point hitch (120);

wherein the tractor (110) is moved toward the cattle chute front structure (131), wherein the chute hitch (150) interfaces with the cattle chute front structure (131), wherein the chute hitch (150) is raised via the hydraulically activated three-point hitch (120), wherein the first hook (160) engages the first side pickup (135), wherein the second hook (161) engages the second side pickup (136), wherein the center hook (162) engages the center pickup (137), wherein the hydraulically activated three-point hitch (120) lifts the cattle chute (130) for transport via the chute hitch (150).

2. The system (100) of claim 1, wherein the first side pickup (135), the second side pickup (136), and the center pickup (137) are each permanently attached to the cattle chute (130) on two opposing ends.

3. The system (100) of claim 1, wherein the first side pickup (135), the second side pickup (136), and the center pickup (137) are constructed from round steel comprising a diameter between 1 inch and 2 inches.

* * * * *